US012643402B2

(12) United States Patent
Feng et al.

(10) Patent No.: US 12,643,402 B2
(45) Date of Patent: Jun. 2, 2026

(54) FLEXIBLE DISPLAY MODULE, VEHICLE-MOUNTED CURVED SURFACE DISPLAY MODULE, AND VEHICLE

(71) Applicants: CHENGDU BOE OPTOELECTRONICS TECHNOLOGY CO., LTD., Chengdu (CN); BOE Technology Group Co., Ltd., Beijing (CN)

(72) Inventors: Binfeng Feng, Beijing (CN); Zhengmao Yu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/996,658

(22) PCT Filed: May 20, 2024

(86) PCT No.: PCT/CN2024/094156
§ 371 (c)(1),
(2) Date: Jan. 17, 2025

(87) PCT Pub. No.: WO2024/245022
PCT Pub. Date: Dec. 5, 2024

(65) Prior Publication Data
US 2026/0027898 A1      Jan. 29, 2026

(30) Foreign Application Priority Data
May 29, 2023    (CN) .......................... 202310620419.6

(51) Int. Cl.
B60K 35/22        (2024.01)
B60K 35/60        (2024.01)
(Continued)

(52) U.S. Cl.
CPC ............ *B60K 35/223* (2024.01); *B60K 35/60* (2024.01); *B60K 35/81* (2024.01); *B60K 37/20* (2024.01)

(58) Field of Classification Search
CPC ...................................................... B60K 35/22
See application file for complete search history.

(56) References Cited

U.S. PATENT DOCUMENTS

2003/0162312 A1*    8/2003    Takayama ............... B60R 11/04
                                                                455/99
2008/0211652 A1*    9/2008    Cope ...................... B60K 35/10
                                                                340/461
(Continued)

FOREIGN PATENT DOCUMENTS

CN          108735912 A        11/2018
CN          110703529 A        1/2020
(Continued)

OTHER PUBLICATIONS

Office Action dated Jun. 19, 2025, issued in counterpart CN Application No. 202310620419.6, with English translation. (18 pages).

*Primary Examiner* — Nan-Ying Yang
(74) *Attorney, Agent, or Firm* — WHDA, LLP

(57)                    ABSTRACT

A flexible display module, a vehicle-mounted curved surface display module, and a vehicle are provided. The flexible display module (10) comprises: a support layer (11); a flexible display panel (12) on the support layer (11); and an optical control layer (13), on the side of the flexible display panel (12) away from the support layer (11), and comprises first and second light control layers (131) and (132) on one side of the first light control layer (131), wherein the dimming rate of the first light control layer (131) is greater than that of the second light control layer (132). The flexible display module (10) uses the first and second light control
(Continued)

layers (131) and (132) to realize visual angle brightness control of different regions, can be applied to vehicle-mounted display to solve the problem whereby curved surface display tends to form a projection on a windshield.

20 Claims, 5 Drawing Sheets

(51) Int. Cl.
    *B60K 35/81*     (2024.01)
    *B60K 37/20*     (2024.01)

(56)           References Cited

U.S. PATENT DOCUMENTS

| | | | | |
|---|---|---|---|---|
| 2011/0128470 A1* | 6/2011 | Yorita | ................... | B60K 37/00 |
| | | | | 359/613 |
| 2018/0062090 A1* | 3/2018 | Kim | ..................... | H10K 50/846 |
| 2020/0269693 A1* | 8/2020 | Chen | ..................... | B60K 35/53 |
| 2022/0176821 A1* | 6/2022 | Hart | ................. | G02F 1/133509 |
| 2022/0413326 A1 | 12/2022 | Li | | |
| 2023/0393311 A1* | 12/2023 | Huang | .................. | B60K 35/60 |

FOREIGN PATENT DOCUMENTS

| | | | |
|---|---|---|---|
| CN | 110770612 A | 2/2020 |
| CN | 111627337 A | 9/2020 |
| CN | 212906828 U | 4/2021 |
| CN | 213182259 U | 5/2021 |
| CN | 113471388 A | 10/2021 |
| CN | 114822286 A | 7/2022 |
| CN | 116631290 A | 8/2023 |
| JP | 2004-245918 A | 9/2004 |
| WO | 2020/021841 A1 | 1/2020 |

\* cited by examiner

131

132

FLEXIBLE DISPLAY MODULE, VEHICLE-MOUNTED CURVED SURFACE DISPLAY MODULE, AND VEHICLE

CROSS-REFERENCE TO RELATED APPLICATION

This application is a U.S. national application of PCT application No. PCT/CN2024/094156 filed on May 20, 2024, which claims the priority of Chinese Patent Publication No. 202310620419.6, filed in China on May 29, 2023, the disclosures of which are incorporated in their entirety by reference herein.

TECHNICAL FIELD

The present disclosure relates to the field of display technology. More specifically, the present disclosure relates to a flexible display module, a vehicle-mounted curved-surface display module, and a vehicle.

BACKGROUND

With the improvement of 5G technology and intelligent cockpit technology, an automobile needs more display screens as carriers for information presentation. The interaction based on a large screen and multiple related screens increases the experience feeling of the driver and passengers, however, excessive display screens can also bring potential safety hazards to the driver. Most of areas of the automobile internal dashboard 32 shown in FIG. 1 and FIG. 2 are difficult to fully be utilized, and the display screen in the automobile is usually suspended on the surface of the dashboard 32 or partially embedded in the dashboard 32 of the automobile at a near vertical angle, and most space of the dashboard cannot be utilized due to the shielding of the display screen. In addition, as shown in FIG. 1, due to the limitation of the space of the dashboard 32 of the automobile, the size and the installation angle of the display screen are greatly limited, and if a planar display screen is embedded in the interior panel of the dashboard of the automobile, a modeling design of the surface of the dashboard 32 is often required.

In the related art, the flexible display module is applied to the vehicle-mounted field, and the flexible display module may be attached to the curved surface in the dashboard 32 of the automobile; however, since the included angle between the dashboard 32 of the automobile and the windshield 31 is usually small, and when the curved surface display is used, the displayed image is easy to form a projection on the windshield 31, resulting in interfering with the sight of the driver and passengers.

SUMMARY

In a first aspect, a flexible display module is provided in the present disclosure. The flexible display module includes: a support layer; a flexible display panel on the support layer; an optical control layer on a side, away from the support layer, of the flexible display panel, wherein the optical control layer includes: a first light control layer and a second light control layer on one side of the first light control layer, wherein a dimming rate of the first light control layer is greater than a dimming rate of the second light control layer.

Optionally, the first light control layer includes a first substrate and a second substrate opposite to each other, a plurality of first light shielding portions arranged in sequence along a direction from the first light control layer to the second light control layer and between the first substrate and the second substrate, and a first light-transmission portion between adjacent first light shielding portions of the plurality of first light shielding portions, first included angles are formed between the plurality of first light shielding portions and a surface of the substrate in a direction from the first light control layer to the second light control layer.

Optionally, the second light control layer includes a third substrate and a fourth substrate opposite to each other, a plurality of second light shielding portions arranged in sequence along a direction from the first light control layer to the second light control layer and between the third substrate and the fourth substrate, and a second light-transmission portion between adjacent second light shielding portions of the plurality of second light shielding portions, second included angles are formed between the plurality of second light shielding portions and a surface perpendicular to the substrate in a direction from the first light control layer to the second light control layer, each of the first included angles is less than one of the second included angles.

Optionally, in a direction from the first light control layer to the second light control layer, the first included angles gradually increase.

Optionally, the optical control layer further includes a light shielding layer between the first light control layer and the second light control layer, both the light shielding layer and the first light control layer are on a surface of a side, away from the support layer, of the flexible display panel, and a color of the light shielding layer is determined according to a transmittance of the first light control layer and a transmittance of the second light control layer.

Optionally, the second light control layer is a polarizer.

Optionally, the flexible display module further includes a stress buffer layer located between the flexible display panel and the optical control layer, and configured to buffer a bending stress between the first light control layer and the second light control layer.

Optionally, the flexible display panel includes an encapsulation layer, the encapsulation layer is flexible encapsulation or rigid encapsulation, and the stress buffer layer is located on a surface of a side, away from the support layer, of the encapsulation layer.

In a second aspect, a vehicle-mounted curved-surface display module is provided in the present disclosure. The display module includes the flexible display module according to the first aspect.

Optionally, the vehicle-mounted curved-surface display module further includes: a texture coating layer on the flexible display module and away from a curved surface, the texture coating layer having a transmittance.

Optionally, the vehicle-mounted curved-surface display module includes: a first working state in which the texture coating layer displays a picture generated in a display mode of the flexible display module; a second working state in which the texture coating layer displays a texture of the texture coating layer in a screen-off mode of the flexible display module.

In a third aspect, a vehicle is provided in the present disclosure. The vehicle includes: a windshield at a head of the vehicle, a dashboard, and the vehicle-mounted curved-surface display module according to the second aspect; wherein the dashboard includes: a horizontal table, wherein an end portion of the horizontal table extends to intersect with the windshield, wherein a third included angle is formed between the windshield and a horizontal plane of the horizontal table; a curved-surface table connected to the horizontal table, wherein a curved surface of the curved-surface table extends in a direction away from the windshield; a support layer of the flexible display module, which is fixed on the curved surface of the curved-surface table, wherein the first light control layer is closer to the horizontal table than the second light control layer.

BRIEF DESCRIPTION OF THE DRAWINGS

Specific implementations of the present disclosure are further described in detail below with reference to the accompanying drawings.

DETAILED DESCRIPTION

Figure 1:
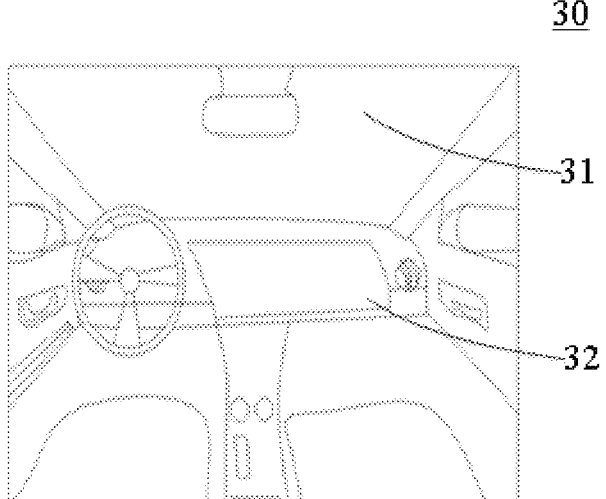
FIG. 1 is a schematic structural diagram of an interior of a vehicle according to the related art.

In order to more clearly illustrate the present disclosure, the present disclosure will be further described below with reference to the embodiments and the accompanying drawings. Like components in the drawings are denoted by like reference numerals. A person skilled in the art should understand that the content specifically described below is illustrative rather than limiting, and should not limit the scope of protection of the present disclosure.

Figure 2:
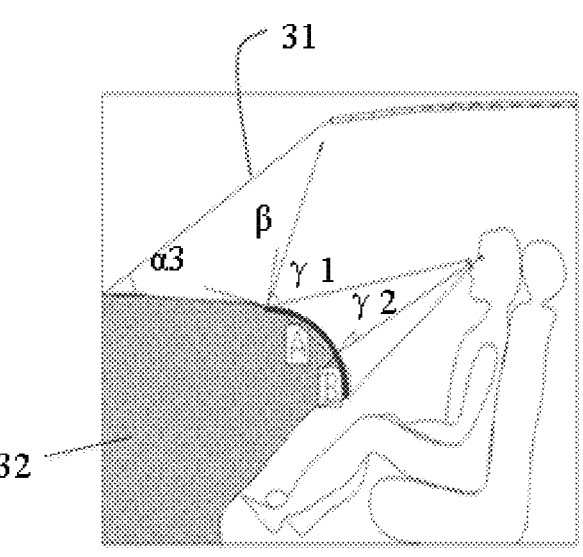
FIG. 2 shows a schematic cross-sectional view of an dashboard area inside a vehicle of the related art.

FIG. 1 shows a schematic structural diagram of the interior of the vehicle 30, and FIG. 2 shows a schematic cross-sectional view of an area of the dashboard 32 inside the vehicle 30.

As shown in FIG. 2, the line of sight of the driver in the driving cabin is relatively fixed, and when the display screen is in a curved-surface state, the angle ($\beta$) of the light emitting direction of the display screen with respect to of the windshield 31 and the angles ($\gamma 1$ and $\gamma 2$) of the light emitting direction of the display screen with respect to the human eye also change due to the change of curvature. As shown in FIG. 2, the light from the portion, located at the position A, of the display screen not only enters the human eye, but also enters the windshield 31 to form a projection, thereby affecting the display effect and the safety of the driver and passengers, and the driver and passengers need to be greatly lowered to see the light from the portion, located at the position B, the display screen, which also affects the safety of the driver and passengers, and in view of this, the area and the space of the dashboard 32 inside the vehicle 30 are difficult to be fully utilized, and limits of a space and a light field of view exist when arranging the display screen in the area of the dashboard 32.

The present disclosure provides a flexible display module, a vehicle-mounted curved-surface display module, and a vehicle to solve the above problems.

Figure 3:
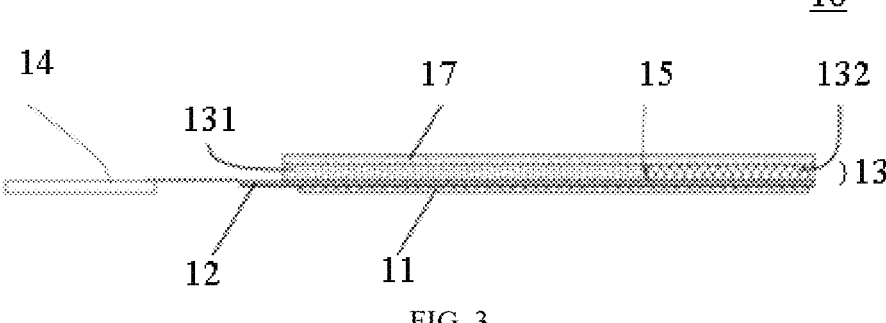
FIG. 3 is a schematic structural diagram of a flexible display module according to an embodiment of the present disclosure.

As shown in FIG. 3, a first embodiment of the present disclosure provides a flexible display module 10, and the flexible display module 10 includes: a support layer 11, a flexible display panel 12 disposed on the support layer 11, an optical control layer 13 disposed on a side of the flexible display panel 12 away from the support layer 11, the optical control layer 13 includes a first light control layer 131 and a second light control layer 132 located on one side of the first light control layer 131, wherein a dimming rate of the first light control layer 131 is greater than a dimming rate of the second light control layer 132.

When the flexible display module 10 of the embodiment of the present disclosure is applied to the vehicle-mounted curved-surface display device, as shown in FIG. 2, the vehicle-mounted curved-surface display device is mounted at the arc-shaped surface of the dashboard 32, the third included angle $\alpha$ between the windshield 31 and the horizontal plane of the dashboard 32 is generally 30-45°, or lower, such as 25° in some coupes. The included angle between the normal line of the flexible display panel 12 at the position A and the light emitted towards the windshield 31 by the vehicle-mounted curved-surface display module at the position A is beta ($\beta$), and the angle between the light emitted by the flexible display panel 12 at the position A and the normal line at the position A is $\gamma 1$. Since the vehicle-mounted curved-surface display module, when being installed, is inclined towards the driver and the passengers, $\gamma 1 > \beta$.

In the flexible display module 10 of the embodiments of the present disclosure, the first light control layer 131 and the second light control layer 132 are used to control the viewing angle brightness of different regions, which can be applied to vehicle-mounted display, the angle $\beta$ is changed by the first light control layer 131, the light emission angle of light of the flexible display module 10 is controlled, and the problem that it is easy to form a projection on the windshield 31 by the curved-surface display is solved.

As shown in FIG. 3, an example of the support layer 11 of the embodiment of the present disclosure is super clean foam (SCF), which may buffer an external force and prevent the flexible display module 10 from being damaged by an adhering press during the adhering process of the flexible display module 10.

In a specific example, as shown in FIG. 3, the flexible display module 10 further includes a circuit board 14 electrically connected to the flexible display panel 12

Figure 4:
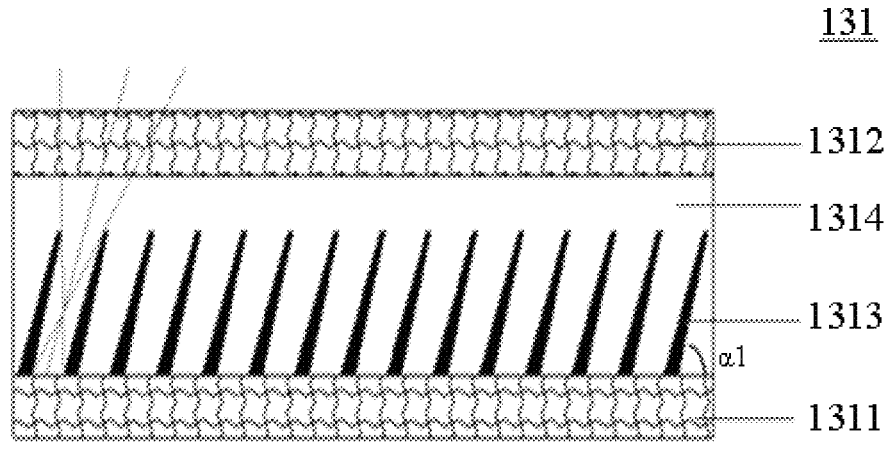
FIG. 4 is a schematic structural diagram of a first light control layer according to an optional embodiment of the present disclosure.

The structures of the first light control layer 131 and the second light control layer 132 of the embodiments of the present disclosure will now be designed, In an optional embodiment, as shown in FIG. 4, the first light control layer 131 includes a first substrate 1311 and a second substrate 1312 disposed opposite to each other, a plurality of first light-shielding portions 1313 disposed between the first substrate 1311 and the second substrate 1312 in a direction from the first light control layer 131 to the second light control layer 132, and a first light-transmission portion 1314 located between adjacent first light-shielding portions 1313, In this embodiment, the first light control layer 131 has a first light-transmission portion 1314 and a second light-shielding portion arranged at intervals. When the emergent light of the flexible display module 10 is incident on the first light control layer 131, the emergent light that is smaller than the preset emergent angle range of the flexible display module 10 can pass through the light-transmission portion, the emergent light greater than the preset emergent angle range is blocked by the light shielding portion, and the transmittance of the first light control layer 131 is adjusted by adjusting the angle of the first included angle.

In an optional embodiment, in a direction from the first light control layer 131 to the second light control layer 132, a first included angle α1 is formed between the first light shielding portion 1313 and a surface of the substrate. In the embodiment, the first light shielding portion 1313 is designed to be inclined by the first included angle α1, and thus the brightness of the angle of view is not designed symmetrically, and in a specific example, the maximum brightness of the angle of view corresponds to 60~70°, resulting a better effect of light control.

In a specific example, as shown in FIG. 2, when the flexible display module 10 is applied to a vehicle-mounted display, the first light control layer 131 is disposed at a side close to the vehicle head, that is, the position A shown in FIG. 2, and the second light control layer 132 is disposed at a side away from the vehicle head, that is, at a position B shown in FIG. 2; through the arrangement, the first light control layer 131 can control the light emitted by the flexible display panel 12 to be emitted in a direction away from the windshield 31, thereby preventing the emitted light from being projected toward the windshield 31, affecting the display effect and the angle of view of the driver and passengers.

In an optional embodiment, the end surface and/or the side wall surface, away from the first substrate 131, of the first light shielding portion 1313 1 is formed as a diffuse reflection surface, so that the light reflectivity of the visible light can be reduced through the arrangement.

In a specific example, the first light control layer 131 is a light control film (LCF), and the light control film of this type can narrow the range of the angles of the emitted light, thereby controlling the angle of the emitted-light to adjust the light.

Figure 5:
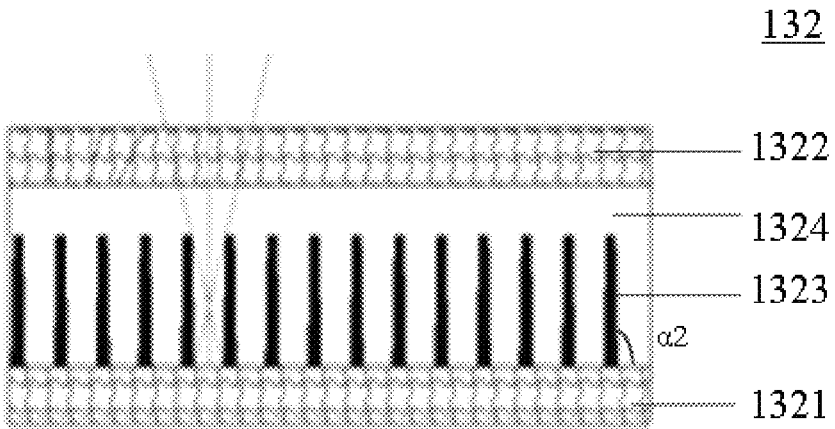
FIG. 5 is a schematic structural diagram of a second light control layer according to an optional embodiment of the present disclosure.

In an optional embodiment, as shown in FIG. 5, the second light control layer 132 includes a third substrate 1321 and a fourth substrate 1322 opposite to each other, a plurality of second light shielding portions 1323 disposed between the third substrate 1321 and the fourth substrate 1322 in a direction from the first light control layer 131 to the second light control layer 132, and a second light-transmission portion 1324 located between adjacent second light shielding portions 1323.

In this embodiment, the second light control layer 132 has the second light-transmission portion 1324 and the second light-shielding portion 1323 that are arranged at intervals. When the light emitted from the flexible display module 10 is incident on the second light control layer 132, the emergent light of the flexible display module 10 which is emitted at an angle a smaller than the preset emergent angle range of the flexible display module 10 can pass through the light-transmission portion, the emergent light which is emitted at an angle greater than the preset emergent angle range is blocked by the light-shielding portion, and the transmittance of the second light control layer 132 is adjusted by adjusting the angle of the second included angle.

In an optional embodiment, in a direction from the first light control layer 131 to the second light control layer 132, the second light shielding portion 1323 forms a second included angle α2 with respect to a surface of the substrate.

In a specific example, as shown in FIG. 2, when the flexible display module 10 is applied to a vehicle-mounted display, the second light control layer 132 is disposed away from the vehicle head, that is, at a position B shown in FIG. 2, because the curved surface of the dashboard 32 at the position is inclined to the driver and passengers, the second light control layer 132 needs to control more light at the position to enter the field of view of the driver and passengers, that is, emit the light close to the windshield 31 to optimize the angle of view of the driver and passengers.

In the embodiment of the present disclosure, the first included angle α1 is smaller than the second included angle α2, that is, the inclination angles of the first light shielding portion 1313 and the second light shielding portion 1323 of the present embodiment are different, that is, the directions of controlling the light by the first light control layer 131 and the second light control layer 132 are opposite. The first light control layer 131 controls the light to propagate away from the windshield 31 to prevent light from being incident on the windshield 31, and the second light control layer 132 controls the light to propagate towards the side close to the windshield 31, thereby increasing the viewing angle brightness of the light incident to the driver and passengers. In a specific example, the second included angle α2 is close to 90°, and the light control effect of this angle range is better.

In an optional embodiment, the end surface and/or the side wall surface of the first light shielding portion 1313 away from the first substrate 1311 are formed as a diffuse reflection surface, so that the light reflectivity of the visible light can be reduced through the arrangement.

In a specific example, the second light control layer 132 is a light control film (LCF), and the light control film of this type can narrow the range of the angles of the emergent light, thereby controlling the angle of the emergent light to adjust the light.

Figure 6:
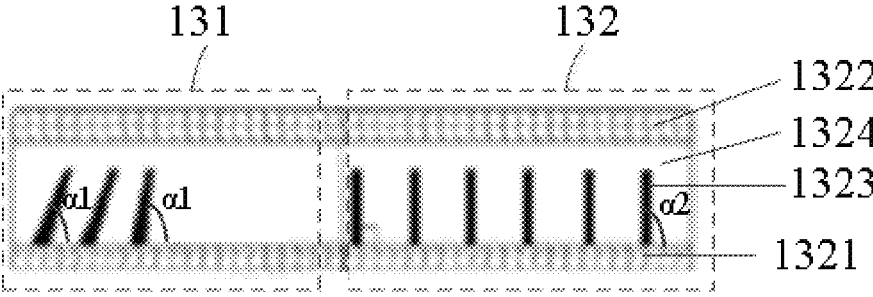
FIG. 6 is a schematic structural diagram of a first light control layer and a second light control layer according to an optional embodiment of the present disclosure.

In an optional embodiment, as shown in FIG. 6, in a direction from the first light control layer 131 to the second light control layer 132, the first included angle α1 gradually increases.

Compared with the design of the first included angle α1 having the fixed value shown in FIG. 4, in this embodiment, the angle of the first included angle α1 is designed to be gradually changed, and the light control performance of the first light control layer 131 in the direction is also changed by using the relationship between the first included angle α1 and the light control in this arrangement, which takes into account that the curvature of the dashboard of the first light control layer 131 in the direction away from the windshield 31 changes as shown in FIG. 2, so that the control of the incident light by the first light control layer 131 changes along with the curvature of the curved surface of the dashboard 32 by setting the gradually increased first included angle α1, thereby improving the light control effect of the first light control layer 131.

In another optional embodiment, in a direction from the first light control layer 131 to the second light control layer 132, the second included angle α2 gradually increases.

Based on a similar principle, the curvature of the dashboard 32 in the direction away from the windshield 31 is changed, and when the curved surface of the dashboard 32 is located on the side close to the driving seat, the head of the driver needs to be lowered to watch the flexible display panel 12. Thus, the control of the incident light by the second light control layer 132 changes along with the curvature of the curved surface of the dashboard 32 by setting the gradually increasing second included angle α2, so that the light control effect of the second light control layer 132 is improved, and more light of the flexible display panel 12 is incident into the human eye.

Figure 7:
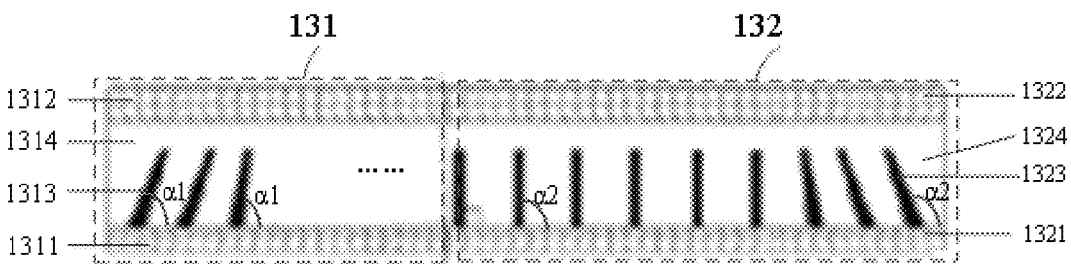
FIG. 7 is a schematic structural diagram of a first light control layer and a second light control layer according to an optional embodiment of the present disclosure.

Based on the structures shown in FIG. 6 and FIG. 7, in an optional embodiment, the first light control layer 131 and the second light control layer 132 are integrally designed, and through this arrangement, the stress between the independently disposed films of the first light control layer 131 and the second light control layer 132 can be improved, and the reliability of the flexible display module 10 is improved.

In an optional embodiment, as shown in FIG. 3, the optical control layer 13 further includes a light shielding layer 15 located between the first light control layer 131 and the second light control layer 132, both the light shielding layer and the first light control layer 131 are located on a surface of a side, away from the support layer 11, of the flexible display panel 12, and a color of the light shielding layer is determined according to a transmittance of the first light control layer 131 and the second light control layer 132.

Considering that in the integrated structural design of the first light control layer 131 and the second light control layer 132, a difficulty of manufacturing is significant. The first light control layer 131 and the second light control layer 132 are arranged independently in this embodiment. Under this design, in order to avoid "bright lines" generated between the first light control layer 131 and the second light control layer 132 and visible to human eyes due to different light transmittances and light control performances of the first light control layer 131 and the second light control layer 132, the light shielding layer is coated in the spacings between the sidewalls of the first light control layer 131 and the second light control layer 132. Further, since the first light control layer 131 and the second light control layer 132 have a certain transmittance, the material of the light shielding layer is also made of a material having a transmittance, thereby avoiding the problem of bright lines, and realizing the integrated display of the display areas corresponding to the first light control layer 131 and the second light control layer 132. In a specific example, the material of the light shielding layer is a gray OCA adhesive, the transmittance is 60%-70%, and the light shielding layer has a good integrated display effect.

In an optional embodiment, the second light control layer 132 is a polarizer. Different from the foregoing embodiment in which light adjustment is performed by using the second light control layer 132, it is considered that the second light control layer 132 is disposed on a side away from the windshield 31, and light of the flexible display module 10 is not transmitted to the windshield 31. Therefore, in another embodiment, the light of the flexible display panel 12 of the embodiment of the present disclosure is polarized by using the polarizer, causing a lower cost.

In addition, the polarizer of the embodiment of the present disclosure is only disposed at a position corresponding to the second light control layer 132 and is not stacked with the first light control layer 131, so that the thickness of the flexible display module 10 can be reduced, and the influence on the light transmittance of the flexible display panel 12 under the stack design of the first light control layer 131 and the polarizer can be avoided.

Figure 8:
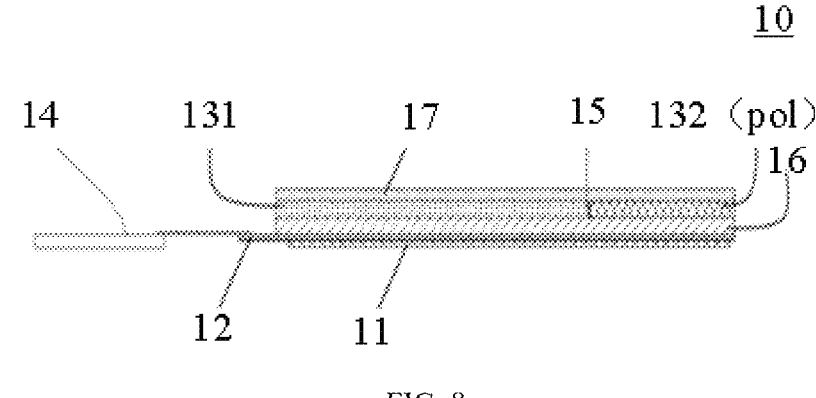
FIG. 8 is a schematic structural diagram of a flexible display module according to an optional embodiment of the present disclosure.

In an optional embodiment, as shown in FIG. 8, the flexible display module 10 further includes a stress buffer layer 16 located between the flexible display panel 12 and the optical control layer 13, and configured to buffer a bending stress between the first light control layer 131 and the second light control layer 132.

In a specific example, the stress buffer layer 16 includes a CPI (polyimide flexible material), a UTG (flexible glass), or a transparent optical film, to enhance the overall strength of the flexible display module 10 and reduce the stress impact caused by the partition of the first light control layer 131 and the second light control layer 132.

In an optional embodiment, the flexible display panel 12 includes an encapsulation layer (not shown in FIG. 3), the encapsulation layer is a flexible encapsulation or a rigid encapsulation, and the stress buffer layer is located on a surface of a side, away from the support layer 11, of the encapsulation layer. Through this arrangement, the encapsulation process of the flexible display panel 12 has a wider applicability in the embodiments of the present disclosure.

Further, in an example of the stress buffer layer 16 shown in FIG. 8, the stress buffer layer 16 and the flexible display panel 12 are respectively disposed, and an orthographic projection of the stress buffer layer 16 falls within an orthographic projection of the flexible display panel 12, that is, an area of the stress buffer layer 16 is smaller than an area of the flexible display panel 12.

In another embodiment, the stress buffer layer 16 and the flexible display panel 12 are integrally designed, and an orthographic projection of the stress buffer layer 16 coincides with an orthographic projection of the flexible display panel 12, that is, an area of the stress buffer layer 16 is the same as an area of the flexible display panel 12, to implement an integrated design.

In an optional embodiment, a protective film 17 is disposed on a surface of a side, away from the support layer 11, of the first light control layer 131 and the second light control layer 132, and an orthographic projection of the protective film 17 on the support layer 11 covers an orthographic projection of the first light control layer 131 and the second light control layer 132 on the support layer 11 for protecting the display module.

Based on the above design, the flexible display module 10 of the embodiment of the present disclosure uses the first light control layer 131 and the second light control layer 132 to control the viewing angle brightness of different areas, can be applied to vehicle-mounted display, controls the light emission angle of the flexible display module 10 by changing the angle β by using the first light control layer 131, solves the problem that the curved-surface display is easy to generate a projection on the windshield 31, and increases the light incident to the human eyes through the second light control layer 132 to improve the visual effect of drivers and passengers at different positions.

Figure 9:
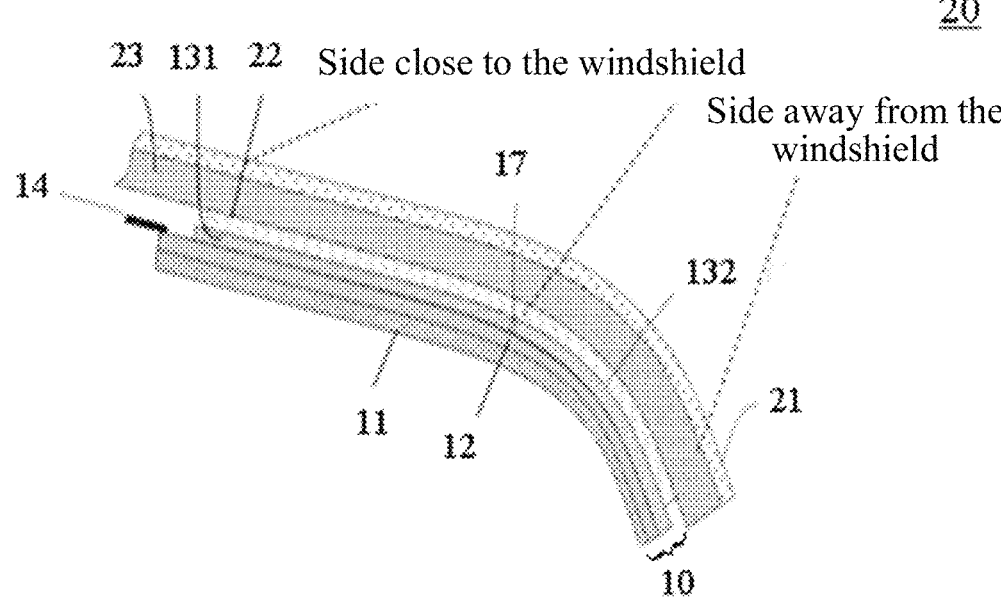
FIG. 9 is a schematic structural diagram of applying the flexible display module shown in FIG. 3 to a curved-surface display according to another embodiment of the present disclosure.
Figure 10:
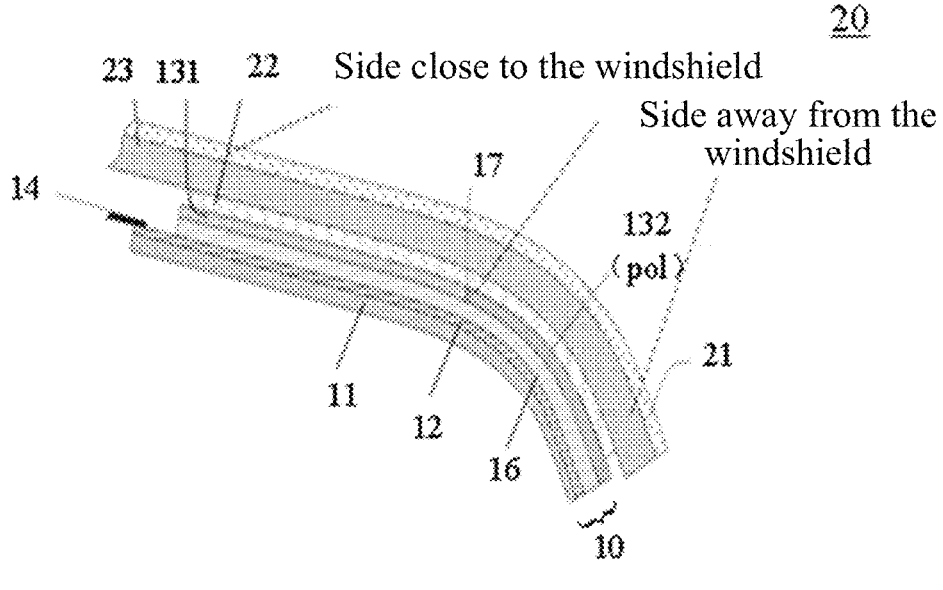
FIG. 10 is a schematic structural diagram of applying a flexible display module with a stress buffer layer in FIG. 8 to a curved-surface display.

A second embodiment of the present disclosure provides a vehicle-mounted curved-surface display module 20, as shown in FIG. 9, including a flexible display module 10 according to an embodiment of the present disclosure FIG. 9 shows a schematic structural diagram of applying the flexible display module 10 shown in FIG. 3 to a curved-surface display. In another embodiment, FIG. 10 is a schematic structural diagram of applying the flexible display module 10 in FIG. 8 with the stress buffer layer 16 to a curved-surface display. In another embodiment, FIG. 11 shows a schematic structural diagram of applying, to a curved-surface display, the second light control layer 132 which is a polarizer (pol), that is, the curved-surface display module according to the embodiments of the present disclosure can be applied to curved-surface display, and has wide applicability.

It should be noted that when the curved-surface display module is applied to the curved-surface display, the protective film 17 is torn off and is attached to the film layer of the vehicle-mounted curved-surface display module 20.

Figure 11:
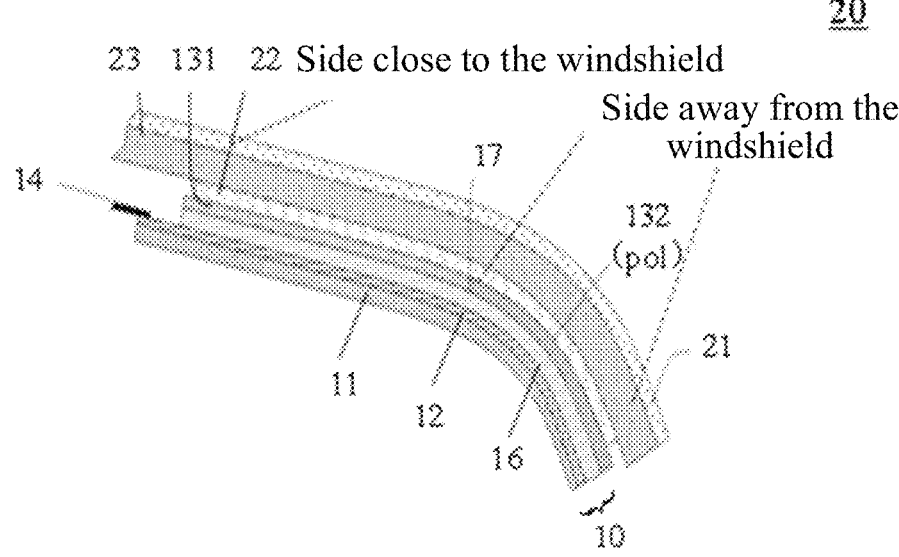
FIG. 11 is a schematic structural diagram of applying a flexible display module with a second light control layer being a polarizer to a curved-surface display.

In an optional embodiment, as shown in FIG. 9 to FIG. 11, the vehicle-mounted curved-surface display module 20 further includes: a texture coating layer 21 located on the flexible display module 10 away from the curved surface, the texture coating layer 21 has a transmittance.

In the embodiment of the present disclosure, the texture coating layer 21 has a semi-transparent characteristic, and on the one hand, the texture coating layer 21 can cover the visual difference caused by the optical characteristic difference between the first light control layer 131 and the second light control layer 132. On the other hand, the surface of the light-emitting display device of the flexible display panel 12 has an evaporation metal cathode, the reflectivity is high, the surface reflectivity of the flexible display panel 12 can be reduced by using the asymmetrically designed first light control layer 131, the reflectivity of the metal cathode is further reduced under the coverage of the semi-transparent texture coating layer 21, and the reflectivity of the vehicle-mounted curved surface display can be effectively reduced.

In an optional embodiment, a surface texture of a side of the texture coating layer 21 away from the flexible display module 10 is consistent with a texture of the curved surface. For example, the texture coating layer 21 may have metallic luster, wood veneer texture, other line textures, etc. which are consistent with the texture of the curved surface of the dashboard 32, ensuring the surface consistency of the dashboard 32 and the texture coating layer 21, and improving the visual effect inside the vehicle 30.

In an optional embodiment, the vehicle-mounted curved-surface display module 20 includes: a first working state in which the texture coating layer 21 displays a picture generated in a display mode of the flexible display module 10; a second working state in which the texture coating layer 21 displays the texture of the texture coating layer 21 in the screen-off mode of the flexible display module 10.

Based on the foregoing embodiments, the texture of the texture coating layer 21 in the embodiment of the present disclosure is consistent with the structure of the dashboard 32, and the light of the flexible display module 10 can pass through the texture coating layer 21 to be incident to the human eyes by using the characteristic that the texture coating layer 21 has a transmittance, so as to change the different working states of the vehicle-mounted curved-surface display module 20.

For example, in the first working state, the flexible display panel 12 of the flexible display module 10 displays a picture which passes through the first light control layer 131, the second light control layer 132, and the texture coating layer 21 above, and then enters the human eye to implement a display function. In the second working state, the flexible display panel 12 is in a screen-off state and does not emit light, and at this time, the texture of the texture coating layer 21 itself is observed by the human eye, thereby achieving the purpose of hiding the flexible display module 10.

In an optional embodiment, the vehicle-mounted curved-surface display module 20 further includes an adhesive layer 22, for example, an OCA or an OCR adhesive, located between the flexible display module 10 and the texture coating layer 21, so as to fix the two, and when the adhesive layer 22 is directly fixed to the first light control layer 131 and the surface directly away from one side of the second light control layer 132 away from the support layer 11, a height difference between the end surfaces of the first light control layer 131 and the second light control layer 132 (away from the surface of the support layer 11) can be smoothened by using the adhesive layer 22, thereby ensuring a display effect.

Further, the vehicle-mounted curved-surface display module 20 further includes a bearing layer located between the adhesive layer 22 and the texture coating layer 21 for bearing the texture coating layer 21, and in a specific example, the bearing layer is made of a transparent material to ensure light transmittance and further ensure a display effect.

Based on the vehicle-mounted curved-surface display module 20 and the flexible display module 10 of the foregoing embodiments of the embodiments of the present disclosure, the flexible display panel corresponding to the first light control layer 131 and the flexible display panel corresponding to the second light control layer 132 in the embodiments of the present disclosure can be controlled by the controller to be displayed as separately controlled display windows, thereby realizing split-screen display, avoiding gaps generated by the spliced screen, and improving the space utilization rate and the display effect.

Figure 12:
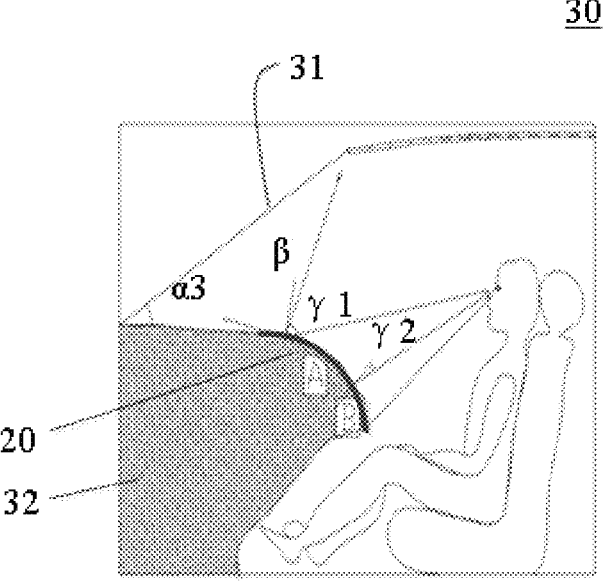
FIG. 12 is a schematic structural diagram of a flexible display applied to a vehicle-mounted curved-surface according to another embodiment of the present disclosure.

Another embodiment of the present disclosure provides a vehicle 30, as shown in FIG. 12, including: a windshield 31 located at the head of the vehicle, a dashboard 32, and the vehicle-mounted curved-surface display module 20 of the foregoing embodiment of the present disclosure.

The dashboard 32 includes: a horizontal table, wherein an end portion of the horizontal table extends to intersect with the windshield 31, wherein a third included angle α3 is formed between the windshield 31 and a horizontal plane of the horizontal table; a curved-surface table connected to the horizontal table, wherein a curved surface of the curved-surface table extends in a direction away from the windshield 31; a support layer 11 of the flexible display module 10, which is fixed on the curved surface of the curved-surface table, wherein the first light control layer 131 is closer to the horizontal table than the second light control layer 132.

In the vehicle 30 of the embodiment of the present disclosure, when the vehicle-mounted flexible display module 10 is in the first working state, the first light control layer 131 and the second light control layer 132 are used to adjust the light, the problem that the curved surface display can easily form a projection on the windshield 31 can be addressed, and differential requirement for different viewing angle brightness at different regions by the curved surface display on the same display module can be satisfied. The vehicle-mounted flexible curved-surface display module of the embodiment of the present disclosure can realize the function of multi-screen interaction on the same curved-surface module, so that the requirement of the whole vehicle design on the number of display modules can be reduced, gaps generated by multi-screen splicing are eliminated, and the integrated design of the dashboard 32 area is facilitated.

In an optional embodiment, the supporting layer 11 of the flexible display module 10 of the embodiment of the present disclosure is attached to the curved-surface of the dashboard 32, that is to say, the flexible display module 10 of the embodiment of the present disclosure is designed to be directly attached to the dashboard 32 inside the vehicle 30, so that the internal space occupation of the vehicle can be reduced, and the cost can be reduced.

According to the flexible display module of the embodiments of the present disclosure, the first light control layer and the second light control layer are used to control the viewing angle brightness of different regions, which can be applied to vehicle-mounted display, the angle of β is changed by the first light control layer, the light emission angle of the flexible display module is controlled, and the problem that the curved-surface display is tend to generate a projection on the windshield is solved.

In the description of the present disclosure, relational terms such as first and second are only used to distinguish one entity or operation from another entity or operation, and do not necessarily require or imply that any such actual relationship or order exists between these entities or operations. Moreover, the terms "comprising," "including," or any other variation thereof are intended to cover a non-exclusive inclusion, so that a process, method, article, or device that includes a series of elements includes not only those elements, but also other elements that are not explicitly listed, or elements inherent to such a process, method, article, or device. In the absence of more restrictions, elements defined by the statement "includes one" do not exclude existence of additional identical elements in the process, method, article, or device that includes the elements.

Obviously, the above-mentioned embodiments of the present disclosure are merely examples for clearly illustrating the present disclosure, and are not intended to limit the implementations of the present disclosure, and for a person of ordinary skill in the art, on the basis of the above description, other different forms of changes or changes may also be made, which cannot be exhaustive of all the embodiments, and any obvious changes or changes that fall within the technical solutions of the present disclosure are still within the protection scope of the present disclosure.

What is claimed is:

1. A flexible display module, comprising:
a support layer;
a flexible display panel on the support layer; and
an optical control layer on a side, away from the support layer, of the flexible display panel, wherein the optical control layer comprises: a first light control layer and a second light control layer on one side of the first light control layer, wherein
a dimming rate of the first light control layer is greater than a dimming rate of the second light control layer,
the first light control layer comprises a first substrate and a second substrate opposite to each other, a plurality of first light shielding portions arranged in sequence along a direction from the first light control layer to the second light control layer and between the first substrate and the second substrate, and a first light-transmission portion between adjacent first light shielding portions of the plurality of first light shielding portions, and
first included angles are formed between the plurality of first light shielding portions and a surface of the substrate in a direction from the first light control layer to the second light control layer.

2. The flexible display module according to claim 1, wherein the second light control layer comprises a third substrate and a fourth substrate opposite to each other, a plurality of second light shielding portions arranged in sequence along a direction from the first light control layer to the second light control layer and between the third substrate and the fourth substrate, and a second light-transmission portion between adjacent second light shielding portions of the plurality of second light shielding portions,
second included angles are formed between the plurality of second light shielding portions and a surface perpendicular to the substrate in a direction from the first light control layer to the second light control layer,
each of the first included angles is less than one of the second included angles.

3. The flexible display module according to claim 2, wherein in a direction from the first light control layer to the second light control layer, the first included angles gradually increase.

4. The flexible display module according to claim 1, wherein the optical control layer further comprises a light shielding layer between the first light control layer and the second light control layer, both the light shielding layer and the first light control layer are on a surface of a side, away from the support layer, of the flexible display panel, and a color of the light shielding layer is determined according to a transmittance of the first light control layer and a transmittance of the second light control layer.

5. The flexible display module according to claim 1, wherein the second light control layer is a polarizer.

6. The flexible display module according to claim 1, wherein the flexible display module further comprises a stress buffer layer located between the flexible display panel and the optical control layer, and configured to buffer a bending stress between the first light control layer and the second light control layer.

7. The flexible display module according to claim 6, wherein the flexible display panel comprises an encapsulation layer, the encapsulation layer is flexible encapsulation or rigid encapsulation, and the stress buffer layer is located on a surface of a side, away from the support layer, of the encapsulation layer.

8. A vehicle-mounted curved-surface display module, comprising a flexible display module according to claim 1.

9. The vehicle-mounted curved-surface display module according to claim 8, wherein the vehicle-mounted curved-surface display module further comprises:
a texture coating layer on the flexible display module and away from a curved surface, the texture coating layer having a transmittance.

10. The vehicle-mounted curved-surface display module according to claim 9, wherein the vehicle-mounted curved-surface display module comprises:
a first working state in which the texture coating layer displays a picture generated in a display mode of the flexible display module;
a second working state in which the texture coating layer displays a texture of the texture coating layer in a screen-off mode of the flexible display module.

11. A vehicle, comprising:
a windshield at a head of the vehicle,
a dashboard, and
a vehicle-mounted curved-surface display module, wherein the vehicle-mounted curved-surface display module comprises a flexible display module according to claim 1, wherein the dashboard comprises:

a horizontal table, wherein an end portion of the horizontal table extends to intersect with the windshield, wherein a third included angle is formed between the windshield and a horizontal plane of the horizontal table;

a curved-surface table connected to the horizontal table, wherein a curved surface of the curved-surface table extends in a direction away from the windshield;

a support layer of the flexible display module, which is fixed on the curved surface of the curved-surface table, wherein the first light control layer is closer to the horizontal table than the second light control layer.

12. The vehicle-mounted curved-surface display module according to claim 8, wherein the second light control layer comprises a third substrate and a fourth substrate opposite to each other, a plurality of second light shielding portions arranged in sequence along a direction from the first light control layer to the second light control layer and between the third substrate and the fourth substrate, and a second light-transmission portion between adjacent second light shielding portions of the plurality of second light shielding portions, second included angles are formed between the plurality of second light shielding portions and a surface perpendicular to the substrate in a direction from the first light control layer to the second light control layer, each of the first included angles is less than one of the second included angles.

13. The vehicle-mounted curved-surface display module according to claim 12, wherein in a direction from the first light control layer to the second light control layer, the first included angles gradually increase.

14. The vehicle-mounted curved-surface display module according to claim 8, wherein the optical control layer further comprises a light shielding layer between the first light control layer and the second light control layer, both the light shielding layer and the first light control layer are on a surface of a side, away from the support layer, of the flexible display panel, and a color of the light shielding layer is determined according to a transmittance of the first light control layer and a transmittance of the second light control layer.

15. The vehicle-mounted curved-surface display module according to claim 8, wherein the second light control layer is a polarizer.

16. The vehicle-mounted curved-surface display module according to claim 8, wherein the flexible display module further comprises a stress buffer layer located between the flexible display panel and the optical control layer, and configured to buffer a bending stress between the first light control layer and the second light control layer.

17. The vehicle-mounted curved-surface display module according to claim 16, wherein the flexible display panel comprises an encapsulation layer, the encapsulation layer is flexible encapsulation or rigid encapsulation, and the stress buffer layer is located on a surface of a side, away from the support layer, of the encapsulation layer.

18. A flexible display module, comprising:

a support layer;

a flexible display panel on the support layer; and an optical control layer on a side, away from the support layer, of the flexible display panel, wherein the optical control layer comprises: a first light control layer and a second light control layer on one side of the first light control layer, wherein a dimming rate of the first light control layer is greater than a dimming rate of the second light control layer, and the optical control layer further comprises a light shielding layer between the first light control layer and the second light control layer, both the light shielding layer and the first light control layer are on a surface of a side, away from the support layer, of the flexible display panel, and a color of the light shielding layer is determined according to a transmittance of the first light control layer and a transmittance of the second light control layer.

19. A vehicle-mounted curved-surface display module, comprising a flexible display module according to claim 18.

20. A vehicle, comprising:

a windshield at a head of the vehicle;

a dashboard; and a vehicle-mounted curved-surface display module, wherein the vehicle-mounted curved-surface display module comprises a flexible display module according to claim 18, wherein the dashboard comprises:

a horizontal table, wherein an end portion of the horizontal table extends to intersect with the windshield, wherein a third included angle is formed between the windshield and a horizontal plane of the horizontal table;

a curved-surface table connected to the horizontal table, wherein a curved surface of the curved-surface table extends in a direction away from the windshield; and a support layer of the flexible display module, which is fixed on the curved surface of the curved-surface table, wherein the first light control layer is closer to the horizontal table than the second light control layer.

* * * * *